Figure 1:
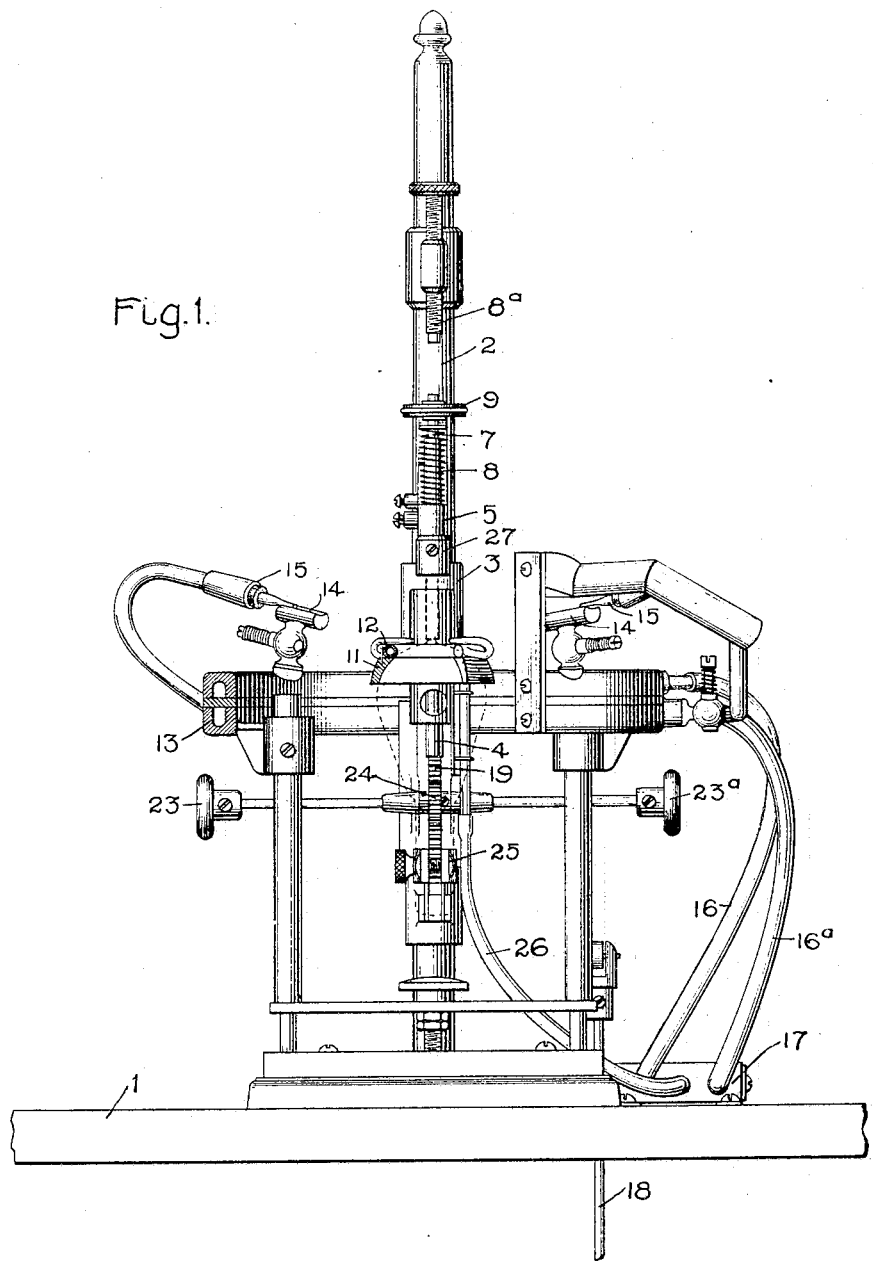

No. 766,321. PATENTED AUG. 2, 1904.
W. R. BURROWS.
TUBULATING MACHINE FOR INCANDESCENT LAMPS.
APPLICATION FILED MAR. 19, 1902.
NO MODEL. 3 SHEETS—SHEET 1.

Witnesses.
Erving R. Gurney.
Helen Orford

Inventor.
William R. Burrows.
by Albert G. Davis
Atty.

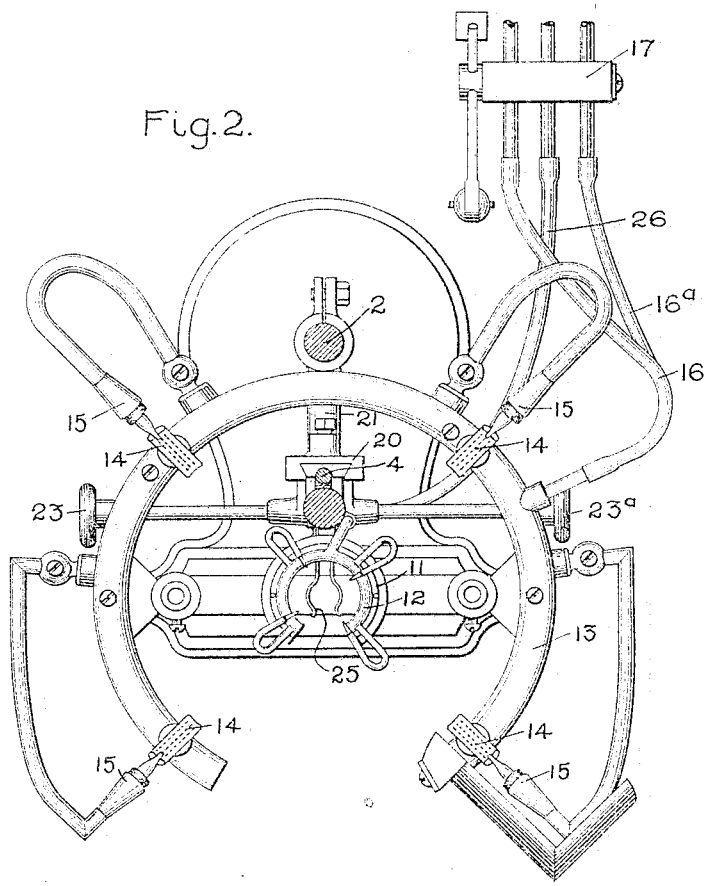

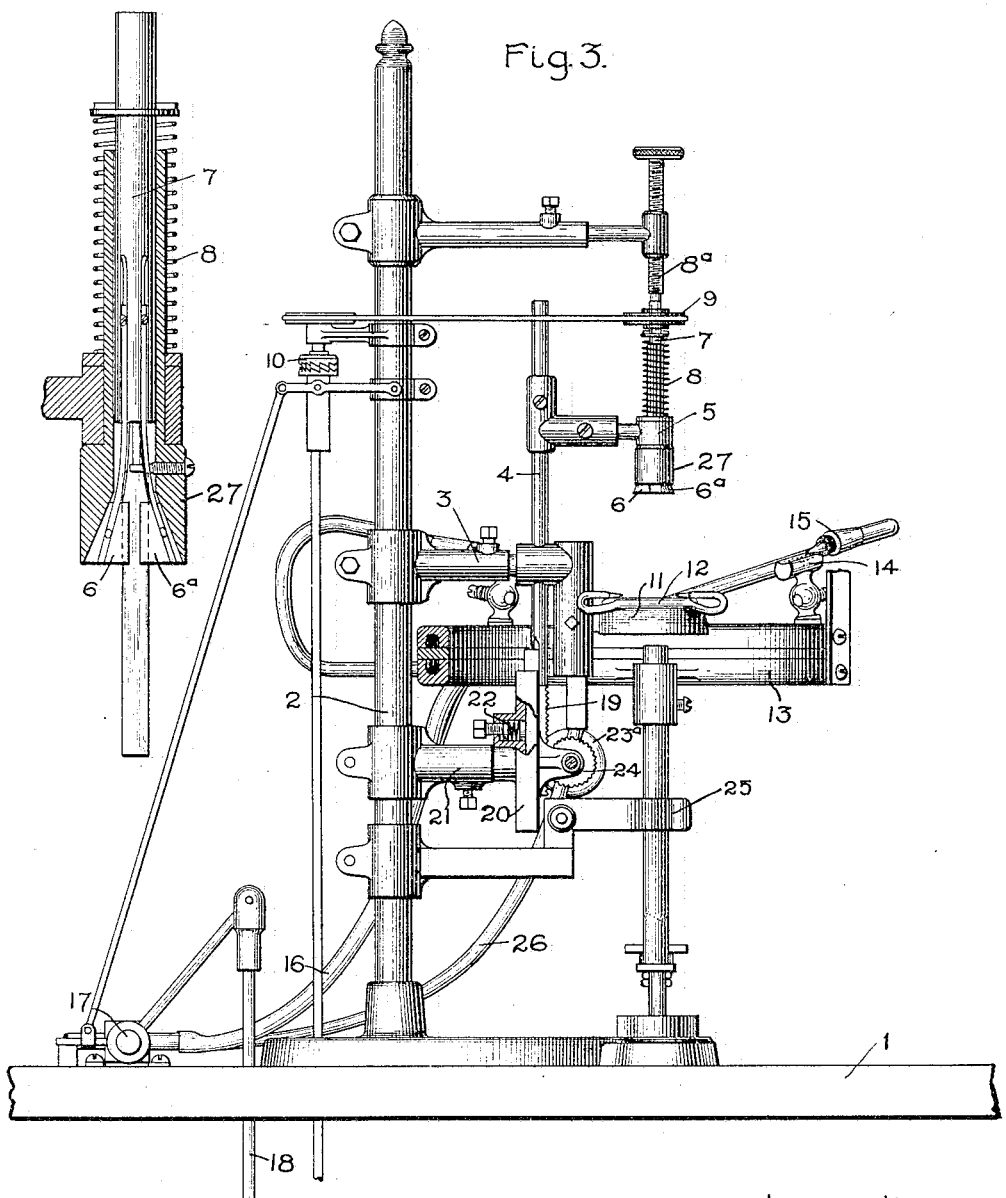

No. 766,321. Patented August 2, 1904.

UNITED STATES PATENT OFFICE.

WILLIAM R. BURROWS, OF NEWARK, NEW JERSEY, ASSIGNOR TO GENERAL ELECTRIC COMPANY, A CORPORATION OF NEW YORK.

TUBULATING-MACHINE FOR INCANDESCENT LAMPS.

SPECIFICATION forming part of Letters Patent No. 766,321, dated August 2, 1904.

Application filed March 19, 1902. Serial No. 98,938. (No model.)

*To all whom it may concern:*

Be it known that I, WILLIAM R. BURROWS, a citizen of the United States, residing at Newark, county of Essex, State of New Jersey, have invented certain new and useful Improvements in Tubulating-Machines for Incandescent Lamps, of which the following is a specification.

In the manufacture of incandescent electric lamps it is the practice to connect a slender tube to the upper part of the bulb-dome to facilitate the operation of forming a vacuum. This is commonly done by hand, requiring considerable skill on the part of the workman and resulting in a product which lacks perfect uniformity. It is the object of the present invention to cheapen this operation of lamp manufacture and to permit a uniform character of product by providing a machine to tubulate the lamp—that is, to form the joint or seal between the slender tube referred to and the dome of the bulb. I provide a machine of this character comprising a clutch for the tube which holds it in a vertical position and a horizontal range of blowpipe-flames striking the tube radially and serving to bring it to a welding temperature. Coaxially mounted with respect to the clutch is a hollow metal frame which receives and limits the upward movement of the lamp-bulb, the latter being held in a spring-clip. The parts are so arranged that the flame may strike the tip of the lamp-dome, where a perforation has been made by prior treatment, at the same time that it heats the end of the tube. The operator when the parts are at the welding temperature brings the two heated walls together, and a perfect joint is thus made, a separating movement of the two parts then drawing a narrow neck in the tube near the bulb, which facilitates the subsequent operation of sealing off after the lamp has been exhausted of its air. The tube may or may not be given a slow turning motion during the heating operation. I prefer to provide for this, as it conduces to a greater regularity in the distribution of the heat, bringing the entire edge of the tube to the welding-point at the same time, thus conducing to a perfect joint. I provide also an air-blast arrangement by which after the seal is effected radial jets of air may be directed against the joint to quickly cool it, thus shortening the operation and increasing the output of the machine per operator.

The novel features will be more particularly described hereinafter and will be definitely indicated in the claims appended to this specification.

In the accompanying drawings, which illustrate the invention, Figure 1 is a side elevation, partly in section, of a machine embodying my improvements. Fig. 2 is a top plan view, partly in section. Fig. 3 is a side elevation on a plane at right angles to that of Fig. 1, the parts being in section. Fig. 4 is a sectional view of the tube-clutch, and Fig. 5 is a perspective view of the valve 17 of Fig. 3.

1 represents a table or bench at which the operator works. Upon this is mounted a stand provided with a post 2, on which parts of the apparatus are mounted. A bracket 3 on this post carries part of the adjusting mechanism for the tube-clutch as well as the clutch itself. The clutch is mounted on a rod 4, being revolubly mounted in a bearing 5, provided in the end of a bracket mounted on rod 4. The clutch comprises a pair of jaws 6 $6^a$, riveted to flexible springs set in the end of a rod 7. (See Fig. 4.) A helical spring 8 presses against a collar on the spindle or rod and raises the latter within a conical opening in the head 27. When a tube is inserted in the jaws, as indicated in Fig. 4, the spring forces the jaws together and clamps the tube with a mild pressure, which permits the latter to be withdrawn by the application of a little force. Above rod 7 is an adjustable stop $8^a$, carried by a bracket mounted on the post 2, so that when the clutch is raised vertically, as will be hereinafter explained, the rod 7 hits the stop $8^a$ and is pressed down, thus opening the jaws 6 $6^a$ of the clutch to receive a new tube. The rod 7 is provided with a pulley 9, adapted to be connected with a revolving shaft driven by any suitable source of power through the instrumentality of a clutch 10, controlled by a treadle, as will be hereinafter described. It will thus be seen that a tube may be inserted in the clutch and held by the tension of the spring 8. Axially with relation to the tube is mounted a hollow receptacle 11 for the dome of the lamp. This receptacle is provided at the top with a circular pipe 12, (see Fig. 1,) to which a number of small tubes are connected to direct the blast radially inward to hasten the cooling of the joint after the lamp has been tubulated. An annular casting composed of three pieces secured together by screws serves as a duct for the gas and air to make the blowpipe-flames. This is indicated at 13. At suitable points around its circumference are mounted gas-burners 14, fed from the upper section of the annulus, and blowers 15, suitably arranged over these heaters, are fed from connections made with the lower chamber of the annulus. Flexible pipes 16 16ª lead to these several chambers through a valve 17, connected by a crank and connecting-rod 18 with a treadle or other suitable operating device to which clutch 10 is also connected. A detail view of the valve is indicated in Fig. 5, from which it will be seen that two sets of ports are provided, one for establishing communication with the air and gas pipes 16 16ª and the other for establishing air communication with a pipe 26, leading to the cooler for the joint. The rod 4, which controls the position of the tube, is secured to a rack 19, slidably mounted in a guide 20, fixed on a bracket 21 and supported by a spring friction-clamp 22. The rack may be raised and lowered by hand-wheels 23 23ª, acting on a pinion 24.

25 represents a spring-clamp for the stem of the lamp-bulb. The parts are so arranged that when the treadle connected with the link 18 is depressed the blowpipe-flames are turned on full blast and proper heat to soften the end of the tube furnished. Another treadle may be depressed to close clutch 10, thus rotating the tube while its end is being heated. These jets being arranged radially with respect to the tube and the latter having a slow revolution of about fifteen turns per minute therein quickly bring the tip to a welding temperature, when the operator inserts the bulb in the clip 25 and lowers, by means of the hand-wheels 23 or 23ª, the tip of the stem into contact with the ridge or projection where the bulb has been perforated. The joint is quickly made, after which the operator reverses the motion of the hand-wheel and raises the tube, thereby stretching the glass, forming a narrow neck at or near the joint, this constriction being of special advantage in sealing off after the vacuum has been formed in the lamp during a subsequent stage of its manufacture. After the tube has been brought to proper temperature and the joint made and the constriction formed in the tube the operator removes her foot from the treadle, the gas-flame being lowered and the air turned on, so as to cool the joint. The completely-tubulated bulb may then be removed from the clip 25 and a fresh operation started. In removing the tubulated bulb the operator turns hand-wheel 23, thus raising the rod 4. The tube now fastened to the bulb slips in the clutch until the tube is released.

What I claim as new, and desire to secure by Letters Patent of the United States, is—

1. A tubulating-machine for glass bulbs, comprising a fixed bulb-support and a tube-clutch arranged to have a common axis, a plurality of radial gas-jets disposed about a point in said axis to effect a uniform heating of the edges to be joined, means for adjusting the support and clutch relatively to each other, and means for simultaneously cutting down the gas-flames and directing air against the joint.

2. A tubulating-machine for glass bulbs, comprising a stationary support for the bulb, a range of gas-jets to heat the edge to be tubulated on all sides which gas-jets play upon a definite part of the bulb, a tube-clutch, means for adjusting it to and from the bulb, and means for directing an air-blast against the joint to cool the same.

3. In a machine for tubulating glass bulbs, the combination of a radial range of gas-jets distributed about a center, a bulb-holder, a range of air-jets around the dome of the bulb, a tube-clutch, means for adjusting it relatively to the bulb, and means for admitting air to the air-jets when the gas is turned down.

In witness whereof I have hereunto set my hand this 17th day of March, 1902.

WILLIAM R. BURROWS.

Witnesses:
S. N. WHITEHEAD,
JOHN E. MITCHELL, Jr.